(12) United States Patent
Zhang et al.

(10) Patent No.: US 8,792,538 B2
(45) Date of Patent: Jul. 29, 2014

(54) METHOD AND APPARATUS FOR TRANSMITTING DATA USING CODEBOOK

(71) Applicant: Huawei Technologies Co., Ltd., Shenzhen (CN)

(72) Inventors: Jiayin Zhang, Shanghai (CN); Jun Ni, Shanghai (CN); Wei Ni, Shenzhen (CN); Ni Ma, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/663,169

(22) Filed: Oct. 29, 2012

(65) Prior Publication Data
US 2013/0182750 A1    Jul. 18, 2013

Related U.S. Application Data

(63) Continuation of application No. PCT/CN2012/075781, filed on May 19, 2012.

(30) Foreign Application Priority Data

Jan. 17, 2012   (CN) .......................... 2012 1 0014037

(51) Int. Cl.
*H04B 1/38* (2006.01)
*H04L 5/16* (2006.01)

(52) U.S. Cl.
USPC .................. 375/219; 370/276; 455/73; 710/1

(58) Field of Classification Search
None
See application file for complete search history.

(56) References Cited

U.S. PATENT DOCUMENTS

2007/0280386 A1* 12/2007 Waes et al. .................... 375/347
2008/0075058 A1*  3/2008 Mundarath et al. ........... 370/342
2008/0095258 A1    4/2008 She et al.

(Continued)

FOREIGN PATENT DOCUMENTS

CN  101127582 A  2/2008
CN  101136718 A  3/2008

(Continued)

OTHER PUBLICATIONS

International Search Report and Written Opinion of the International Searching Authority issued in corresponding PCT Patent Application No. PCT/CN2012/075781, mailed Sep. 27, 2012.

(Continued)

*Primary Examiner* — Shuwang Liu
*Assistant Examiner* — Gina McKie
(74) *Attorney, Agent, or Firm* — Brinks Gilson & Lione

(57) ABSTRACT

The present invention provides a method and an apparatus for transmitting data using a codebook. The method includes: receiving current antenna configuration information of a transmitting end; obtaining a mask matrix corresponding to the current antenna configuration according to the current antenna configuration information; generating a codebook corresponding to the current antenna configuration according to a mother codebook and the mask matrix; selecting one codebook element from the codebook, and transmitting indication information corresponding to the codebook element to the transmitting end; and receiving data transmitted by the transmitting end. In the embodiments of the present invention, a mask matrix is obtained according to current antenna configuration information, and a codebook is generated according to the mask matrix and a mother codebook that is corresponding to the maximum number of antennas and the maximum number of layers that are fed back through channel state information.

4 Claims, 4 Drawing Sheets

(56) References Cited

U.S. PATENT DOCUMENTS

| | | | |
|---|---|---|---|
| 2008/0165869 A1* | 7/2008 | Kent et al. | 375/260 |
| 2009/0122857 A1* | 5/2009 | Li et al. | 375/239 |
| 2009/0128381 A1* | 5/2009 | Choi et al. | 341/106 |
| 2009/0232245 A1* | 9/2009 | Lakkis | 375/267 |
| 2010/0202560 A1 | 8/2010 | Luo et al. | |
| 2010/0211846 A1* | 8/2010 | Matsumoto et al. | 714/752 |
| 2010/0260243 A1 | 10/2010 | Ihm et al. | |
| 2011/0249712 A1 | 10/2011 | Hammarwall et al. | |

FOREIGN PATENT DOCUMENTS

| | | |
|---|---|---|
| CN | 101166052 A | 4/2008 |
| CN | 101414864 A | 4/2009 |
| WO | WO 2010088673 A1 | 8/2010 |

OTHER PUBLICATIONS

Sesia et al., "LTE—The UMTS Long Term Evolution from Theory to Practice" Passage, Great Britain, Sep. 6, 2011, 14 pages.

Love et al., "Limited Feedback Unitary Precoding for Spatial Multiplexing Systems" IEEE Transactions on Information Theory, vol. 51, No. 8, Aug. 2005, 10 pages.

Pan et al., "Transfer Learning to Predict Missing Rates via Heterogeneous User Feedbacks" Proceedings of the Twenty-Second International Joint Conference on Artificial Intelligence, Jul. 22, 2011, 6 pages.

Roopsha et al., "Codebook Adaptation for Quantized MIMO Beamforming Systems" Wireless Networking and Communications Group, IEEE 2005, 5 pages.

\* cited by examiner

US 8,792,538 B2

METHOD AND APPARATUS FOR TRANSMITTING DATA USING CODEBOOK

CROSS-REFERENCE TO RELATED APPLICATIONS

This application is a continuation of International Application No. PCT/CN2012/075781, filed on May 19, 2012, which claims priority to Chinese Patent Application No. 201210014037.0, filed on Jan. 17, 2012, both of which are hereby incorporated by reference in their entireties

FIELD OF THE INVENTION

Embodiments of the present invention relate to the field of wireless communications, and in particular, to a method and an apparatus for transmitting data using a codebook.

BACKGROUND OF THE INVENTION

An MIMO (Multiple Input Multiple Output, multiple input multiple output) system that performs precoding based on a codebook is a manner used by mainstream wireless cellular systems under FDD (Frequency Division Duplex, frequency division duplex) standards. The so-called precoding based on a codebook refers to that a receiving end measures a wireless channel from a transmitting end to itself, selects one matrix (hereinafter referred to as a codebook element) from a predefined set of matrices (hereinafter the set of matrices is referred to as a codebook) known to the transmitting end and the receiving end, and feeds back an index value (Precoding Matrix Indicator, PMI) corresponding to the matrix to the transmitting end, so that the transmitting end learns a channel from itself to the receiving end, and further may select to apply the precoding matrix to signals to be transmitted (such a processing procedure is called precoding), and then transmit the signals. It is assumed that a base station is used as the transmitting end, and a terminal is used as the receiving end. In an LTE (Long Time Evolution, long term evolution) system, the base station is referred to as an eNodeB (Evolved NodeB, evolved base station), and the terminal is referred to as a UE (User Equipment, user equipment). Generally, the eNodeB and the UE store one or more codebooks at the same time, and if a plurality of codebooks is stored, generally different codebooks correspond to different quantities of transmit antennas. After being powered on, the eNodeB broadcasts public information of a cell, for example, the number of transmit antennas configured by the eNodeB, to UEs within its coverage. In addition, the eNodeB informs each UE of a transmission mode being currently used, and then the UE derives according to the information whether the eNodeB transmits signals in a precoding manner, and derives which codebook is used for precoding. The UE measures a channel from the eNodeB to itself, selects an optimal codebook element from the codebook according to preset criteria or methods, and then feeds back PMI corresponding to the codebook element to the eNodeB. After receiving the PMI fed back by the UE, the eNodeB can learn precoding information of the channel from the eNodeB to the UE, and then starts a scheduling process by using the information (and other information).

In LTE Release (release) 8 to Release 10, codebooks are designed for 2, 4 and 8 antennas corresponding to different antenna configuration based on certain criteria. Criteria for designing a 2-antenna codebook are based on DFT (Discrete Fourier Transform, discrete Fourier transform), with 4 codebook elements at most. Criteria for designing a 4-antenna codebook are based on Householder transformation, with 16 codebook elements at most. Criteria for designing an 8-antenna codebook are based on a dual codebook structure, with 256 codebook elements at most.

Because the design of the existing codebooks is set based on single-user MIMO, the accuracy is low, and even becomes lower when the codebook is applied to multi-user MIMO.

SUMMARY OF THE INVENTION

Embodiments of the present invention provide a method and an apparatus for transmitting data using a codebook, which can improve the accuracy of the codebook.

In one aspect, a method for transmitting data using a codebook is provided, including: receiving current antenna configuration information of a transmitting end; obtaining a mask matrix corresponding to the current antenna configuration according to the current antenna configuration information; generating a codebook corresponding to the current antenna configuration according to a mother codebook and the mask matrix, where the mother codebook corresponds to the maximum number of antennas and the maximum number of layers that are fed back through channel state information; selecting one codebook element from the codebook, and transmitting indication information corresponding to the codebook element to the transmitting end, where the indication information is used by the transmitting end to determine channel information of a channel to be used by the transmitting end for transmitting data; and receiving data transmitted by the transmitting end.

In another aspect, a method for transmitting data using a codebook is provided, including: transmitting current antenna configuration information to a receiving end; obtaining a mask matrix corresponding to the current antenna configuration according to the current antenna configuration information; generating a codebook corresponding to the current antenna configuration according to a mother codebook and the mask matrix, where the mother codebook corresponds to the maximum number of antennas and the maximum number of layers that are fed back through channel state information; receiving indication information corresponding to one codebook element in the codebook from the receiving end, and obtaining the codebook element according to the indication information, so as to determine channel information of a channel used for transmitting data; and transmitting data to the receiving end according to the channel information.

In another aspect, an apparatus for transmitting data using a codebook is provided, including: a first receiving unit, configured to receive current antenna configuration information of a transmitting end; an obtaining unit, configured to obtain a mask matrix corresponding to the current antenna configuration according to the current antenna configuration information; a generating unit, configured to generate a codebook corresponding to the current antenna configuration according to a mother codebook and the mask matrix, where the mother codebook corresponds to the maximum number of antennas and the maximum number of layers that are fed back through channel state information; a transmitting unit, configured to select one codebook element from the codebook, and transmit indication information corresponding to the codebook element to the transmitting end, where the indication information is used by the transmitting end to determine channel information of a channel to be used by the transmitting end for transmitting data; and a second receiving unit, configured to receive data transmitted by the transmitting end.

In another aspect, an apparatus for transmitting data using a codebook is provided, including: a first transmitting unit, configured to transmit current antenna configuration information to a receiving end; an obtaining unit, configured to obtain a mask matrix corresponding to the current antenna configuration according to the current antenna configuration information; a generating unit, configured to generate a codebook corresponding to the current antenna configuration according to the mask matrix and a mother codebook, where the mother codebook corresponds to the maximum number of antennas and the maximum number of layers that are fed back through channel state information; a processing unit, configured to receive indication information corresponding to one codebook element in the codebook from the receiving end, and obtain the codebook element according to the indication information, so as to determine channel information of a channel used for transmitting data; and a second transmitting unit, configured to transmit data to the receiving end according to the channel information.

In the embodiments of the present invention, a mask matrix is obtained according to current antenna configuration information, and a codebook is generated according to the mask matrix and a mother codebook corresponding to the maximum number of antennas and the maximum number of layers that are fed back through channel state information, whereby the accuracy of the codebook can be improved.

DETAILED DESCRIPTION OF THE EMBODIMENTS

The technical solutions of the embodiments of the present invention are described clearly and completely below with reference to accompanying drawings. Evidently, the embodiments described below are merely some embodiments rather than all embodiments of the present invention. All other embodiments obtained by persons of ordinary skill in the art based on the embodiments of the present invention without creative efforts shall fall within the protection scope of the present invention.

The technical solutions of the present invention may be applied to various communication systems, for example, a global system of mobile communication (Global System of Mobile communication, GSM), a code division multiple access (CDMA, Code Division Multiple Access) system, wideband code division multiple access (WCDMA, Wideband Code Division Multiple Access Wireless), general packet radio service (GPRS, General Packet Radio Service), long term evolution (LTE, Long Term Evolution) and so on.

A user equipment (UE, User Equipment), which may also be referred to as a mobile terminal (Mobile Terminal) or a mobile user equipment or the like, may communicate with one or more core networks through a wireless access network (for example, RAN, Radio Access Network). The user equipment may be a mobile terminal, such as a mobile phone (or referred to as "cellular phone"), or a computer having a mobile terminal, for example, a portable, pocket, handheld, computer built-in or vehicle mounted mobile device, which exchanges languages and/or data with a wireless access network.

A base station may be a base station (BTS, Base Transceiver Station) in GSM or CDMA, a base station (NodeB) in WCDMA, or an evolved base station (eNB or eNodeB, Evolved NodeB) in LTE, but the present invention is not limited thereto.

Figure 1:
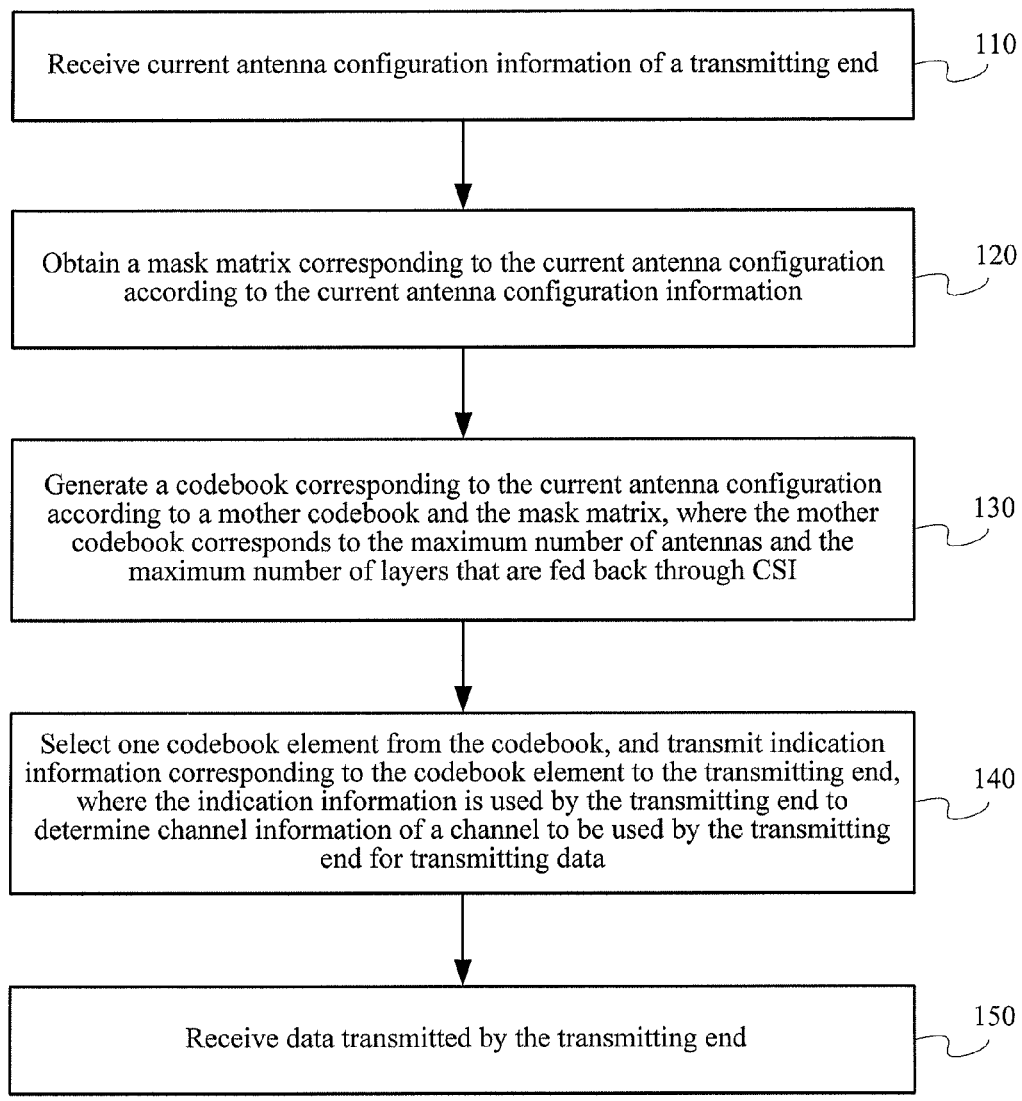
FIG. 1 is a schematic flowchart of a method for transmitting data using a codebook according to an embodiment of the present invention.

FIG. 1 is a schematic flowchart of a method for transmitting data using a codebook according to an embodiment of the present invention. The method in FIG. 1 is executed by a receiving end. For example, the receiving end may be a terminal, such as a UE in an LTE system.

110: Receive current antenna configuration information of a transmitting end.

Optionally, as another embodiment, the receiving end may receive the current antenna configuration information of the transmitting end through a master information block (Master Information Block, master information block) or a system information block (System Information Block, system information block), or may receive the current antenna configuration information of the transmitting end through channel state information reference signal (Channel State Information Reference Signal, CSI-RS) configuration signaling.

That is to say, the receiving end may receive the current antenna configuration information of the transmitting end by using a broadcast manner, a unicast manner, or a multicast manner. Specifically, the use of the broadcast manner may mean that the current antenna configuration information is for all receiving ends in a cell. The use of the unicast manner may mean that the current antenna configuration information is for one receiving end. The use of the multicast manner may mean that the current antenna configuration information is for a group of receiving ends.

Optionally, as another embodiment, if the CSI-RS configuration signaling includes information about a CSI-RS group, the current antenna configuration information may correspond to the CSI-RS group.

120: Obtain a mask matrix corresponding to the current antenna configuration according to the current antenna configuration information.

Optionally, as another embodiment, the current antenna configuration information may include the current number to of antennas of the transmitting end, and the mask matrix may be a ta×tm matrix, where tm is the maximum number of antennas that is fed back through channel state information (Channel State Information, CSI), and in the mask matrix, each element has a value of 0 or 1, at most one element in each line has a value of 1, and at most one element in each column has a value of 1.

130: Generate a codebook corresponding to the current antenna configuration according to a mother codebook and the mask matrix, where the mother codebook corresponds to the maximum number of antennas and the maximum number of layers that are fed back through CSI.

It should be understood that, all or a part of codebook elements in the mother codebook are applicable to any antenna polarization type and any antenna spacing. Because the mother codebook is designed for all possible antenna configuration in a system, all or a part of codebook elements in the mother codebook cover any antenna configuration in the system. In addition, the mother codebook is the same throughout a network.

Optionally, as another embodiment, the receiving end may left-multiply the codebook element $W_M(i)$ in the mother codebook by the mask matrix M, to generate a codebook element W(i) of the codebook, where i is a positive integer, representing a serial number of the codebook element $W_M(i)$ or a serial number of the codebook element W(i). That is, $W(i)=M\times W_M(i)$ where $W_M(i)$ represents an ith codebook element in the mother codebook, and W(i) represents an ith codebook element in the codebook. Because the mask matrix is a matrix of 0's and 1's, the codebook element $W_M(i)$ in the mother codebook is left-multiplied by the mask matrix M, that is, a particular line is extracted from $W_M(i)$, to generate W(i). Therefore, the value of the mask matrix M is also associated with the mother codebook.

Optionally, as another embodiment, in step 120, the current antenna configuration information may further include an antenna polarization type and antenna spacing. In a condition where the mother codebook is a codebook corresponding to 8 antennas in LTE release (Release) 10, if the current antenna configuration is 2 antennas and antenna cross-polarization, the receiving end may obtain a mask matrix of [e1,e5]T. If the current antenna configuration is 2 antennas, antenna co-polarization and half-wavelength antenna spacing, the receiving end may obtain a mask matrix of [e1,e2]T. If the current antenna configuration is 4 antennas, antenna cross-polarization and half-wavelength antenna spacing, the receiving end may obtain a mask matrix of [e1,e2,e6,e7]T. If the current antenna configuration is 4 antennas, antenna co-polarization and half-wavelength antenna spacing, the receiving end may obtain a mask matrix of [e1,e2,e3,e4]T, where ek is an 8×1 column vector, a kth element of ek has a value of 1, all other elements than the kth element have a value of 0, and k is any element in a collection {1,2,3,4,5,6,7,8}. Definitely, k may also be any element in a collection {0, 1, 2, 3,4,5,6,7}. That is, k may be numbered starting from 0, or starting from 1. If k is numbered starting from 0, ek changes correspondingly, for example, [e1,e5] changes correspondingly to [e0,e4], [e1,e2] changes correspondingly to [e0,e1], [e 1,e2,e6,e7] changes correspondingly to [e0,e1,e5,e6], and [e1,e2,e3,e4] changes correspondingly to [e0,e1,e2,e3]. The embodiment of the present invention is not limited thereto. The embodiment of the present invention is illustrated through an example where k is numbered starting from 1.

140: Select one codebook element from the codebook, and transmit indication information corresponding to the codebook element to the transmitting end, where the indication information is used by the transmitting end to determine channel information of a channel to be used by the transmitting end for transmitting data.

Optionally, as another embodiment, the receiving end may further receive indication information, from the transmitting end, for indicating a transmission mode, so as to obtain the transmission mode. The receiving end may select all or a subset of the codebook from the codebook according to the transmission mode to serve as a currently used codebook, where the subset is obtained by down-sampling the codebook; and select the codebook element from the currently used codebook.

For example, because a multi-user transmission mode requires higher codebook accuracy than a single-user transmission mode, the receiving end in the multi-user transmission mode may select the codebook generated in step 130 to serve as the currently used codebook, and the receiving end in the single-user transmission mode may select a codebook obtained by down-sampling the codebook in step 130 to serve as the currently used codebook. It should be understood that, in the embodiment of the present invention, down-sampling may refer to that, for the fixed number of antennas, the number of codebook elements is reduced in a certain manner based on the codebook elements of an original codebook. A value obtained by dividing the number of codebook elements of the original codebook by the number of codebook elements in a codebook after down-sampling is referred to as a down-sampling rate.

It should be noted that, the receiving end may select one codebook element from the currently used codebook according to preset criteria. For example, one codebook element may be selected from the currently used codebook according to a certain index such as throughput, and then all possible codebook elements in the codebook are traversed, and one element is selected as a codebook element which makes the index to the maximum value. The process may be performed with reference to the prior art, so the details will not be described herein again.

Optionally, as another embodiment, the indication information corresponding to the codebook element W(i) may be the PMI of the codebook element $W_M(i)$ in the mother codebook, or may be the PMI of the codebook element W(i).

Optionally, as another embodiment, the indication information may further include first indication information and second indication information, where the first indication information may indicate a codebook group corresponding to channel wideband and long-term channel characteristics in the currently used codebook, the second indication information may indicate a codebook element corresponding to short-term channel characteristics in the codebook group, and the second indication information is determined according to the first indication information.

150: Receive data transmitted by the transmitting end.

In the embodiment of the present invention, a mask matrix is obtained according to current antenna configuration information, and a codebook is generated according to the mask matrix and a mother codebook corresponding to the maximum number of antennas and the maximum number of layers that are fed back through channel state information, whereby the accuracy of the codebook can be improved.

Figure 2:
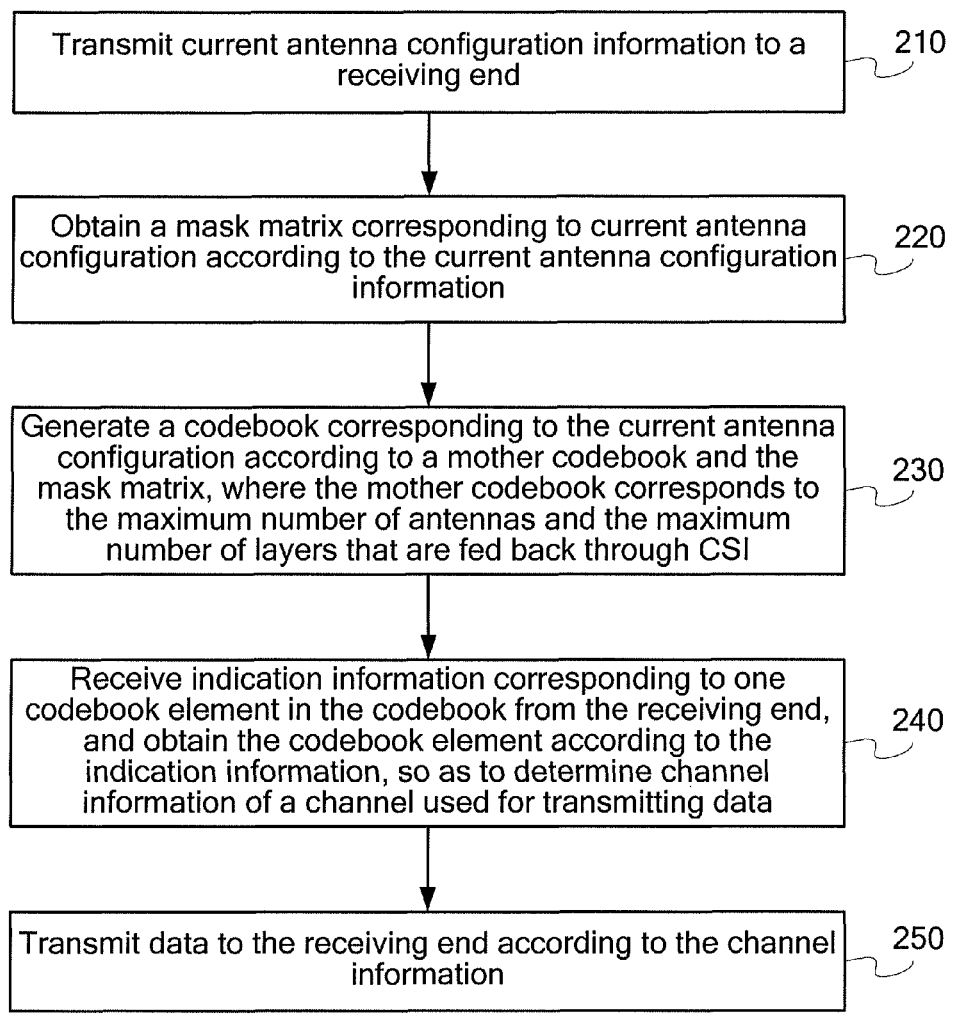
FIG. 2 is a schematic flowchart of a method for transmitting data using a codebook according to another embodiment of the present invention.

FIG. 2 is a schematic flowchart of a method for transmitting data using a codebook according to another embodiment of the present invention. The method in FIG. 2 is executed by a transmitting end. For example, the transmitting end may be a base station, such as an eNodeB in an LTE system.

210: Transmit current antenna configuration information to a receiving end.

Optionally, as an embodiment, the transmitting end may transmit the current antenna configuration information to the receiving end through an MIB or an SIB, or transmit the current antenna configuration information to the receiving end through CSI-RS configuration signaling.

That is to say, the transmitting end may transmit the current antenna configuration information to the receiving end by using a broadcast manner, a unicast manner, or a multicast manner. Specifically, the use of the broadcast manner may mean that the current antenna configuration information is for all receiving ends in a cell. The use of the unicast manner may mean that the current antenna configuration information is for one receiving end. The use of the multicast manner may mean that the current antenna configuration information is for a group of receiving ends.

Optionally, as another embodiment, if the CSI-RS configuration signaling includes information about a CSI-RS group, the current antenna configuration information may correspond to the CSI-RS group.

220: Obtain a mask matrix corresponding to the current antenna configuration according to the current antenna configuration information.

Optionally, as another embodiment, the current antenna configuration information may include the current number to of antennas, and the mask matrix may be a ta×tm matrix, where tm is the maximum number of antennas that is fed back through CSI, and in the mask matrix, each element has a value of 0 or 1, at most one element in each line has a value of 1, and at most one element in each column has a value of 1.

230: Generate a codebook corresponding to the current antenna configuration according to a mother codebook and the mask matrix, where the mother codebook corresponds to the maximum number of antennas and the maximum number of layers that are fed back through channel state information;

It should be understood that, all or a part of codebook elements in the mother codebook are applicable to any antenna polarization type and any antenna spacing. Because the mother codebook is designed for all possible antenna configuration in a system, all or a part of codebook elements in the mother codebook cover any antenna configuration in the system. In addition, the mother codebook is the same throughout a network.

Optionally, as another embodiment, the transmitting end may left-multiply the codebook element $W_M(i)$ in the mother codebook by the mask matrix M, to generate a codebook element $W(i)$ of the codebook, where i is a positive integer, representing a serial number of the codebook element $W_M(i)$ or a serial number of the codebook element $W(i)$. That is, $W(i)=M \times W_M(i)$ where $W_M(i)$ represents an ith codebook element in the mother codebook, and $W(i)$ represents an ith codebook element in the codebook. Because the mask matrix is a matrix of 0's and 1's, the codebook element $W_M(i)$ in the mother codebook is left-multiplied by the mask matrix M, that is, a particular line is extracted from $W_M(i)$, to generate $W(i)$. Therefore, the value of the mask matrix M is also associated with the mother codebook.

Optionally, as another embodiment, the current antenna configuration information may further include an antenna polarization type and antenna spacing. In a condition where the mother codebook is a codebook corresponding to 8 antennas in LTE release 10, if the current antenna configuration is 2 antennas and antenna cross-polarization, the transmitting end may obtain a mask matrix of [e1,e5]T. If the current antenna configuration is 2 antennas, antenna co-polarization and half-wavelength antenna spacing, the transmitting end may obtain a mask matrix of [e1,e2]T. If the current antenna configuration is 4 antennas, antenna cross-polarization and half-wavelength antenna spacing, the transmitting end may obtain a mask matrix of [e1,e2,e6,e7]T. If the current antenna configuration is 4 antennas, antenna co-polarization and half-wavelength antenna spacing, the transmitting end may obtain a mask matrix of [e1,e2,e3,e4]T, where ek is an 8×1 column vector, a kth element of ek has a value of 1, all other elements than the kth element have a value of 0, and k is any element in a collection {1,2,3,4,5,6,7,8}. Definitely, k may also be any element in a collection {0, 1, 2, 3,4,5,6,7}. That is, k may be numbered starting from 0, or starting from 1. If k is numbered starting from 0, ek changes correspondingly, for example, [e1,e5] changes correspondingly to [e0,e4], [e1,e2] changes correspondingly to [e0,e1], [e1,e2,e6,e7] changes correspondingly to [e0,e1,e5,e6], and [e1,e2,e3,e4] changes correspondingly to [e0,e1,e2,e3]. The embodiment of the present invention is not limited thereto. The embodiment of the present invention is illustrated through an example where k is numbered starting from 1.

240: Receive indication information corresponding to one codebook element in the codebook from the receiving end, and obtain the codebook element according to the indication information, so as to determine channel information of a channel used for transmitting data.

Optionally, as another embodiment, the transmitting end may further transmit, to the receiving end, indication information used for indicating a transmission mode. The transmitting end may select, from the codebook generated in step 230, all or a subset of the codebook according to the transmission mode to serve as a currently used codebook, where the subset is obtained by down-sampling the codebook; and select the codebook element from the currently used codebook according to the indication information. For example, because a multi-user transmission mode requires higher codebook accuracy than a single-user transmission mode, the transmitting end in the multi-user transmission mode may select the codebook generated in step 230 to serve as the currently used codebook, and the transmitting end in the single-user transmission mode may select a codebook obtained by down-sampling the codebook in step 230 to serve as the currently used codebook.

Optionally, as another embodiment, the indication information corresponding to the codebook element $W(i)$ may be the PMI of the codebook element $W_M(i)$ in the mother codebook, or may be the PMI of the codebook element $W(i)$.

Optionally, as another embodiment, the indication information may further include first indication information and second indication information, where the first indication information may indicate a codebook group corresponding to channel wideband and long-term channel characteristics in the currently used codebook, the second indication information may indicate a codebook element corresponding to short-term channel characteristics in the codebook group, and the second indication information is determined according to the first indication information. In this way, the transmitting end needs to obtain the codebook element according to the first indication information and the second indication information.

250: Transmit data to the receiving end according to the channel information.

For example, the transmitting end may determine channel information of a channel used for transmitting data to the receiving end according to the codebook element obtained in step 240, and therefore may precode data by using the codebook element, and transmit the precoded data to the receiving end.

In the embodiment of the present invention, a mask matrix is obtained according to current antenna configuration information, and a codebook is generated according to the mask matrix and a mother codebook corresponding to the maximum number of antennas and the maximum number of layers that are fed back through channel state information, whereby the accuracy of the codebook can be improved.

Figure 3:
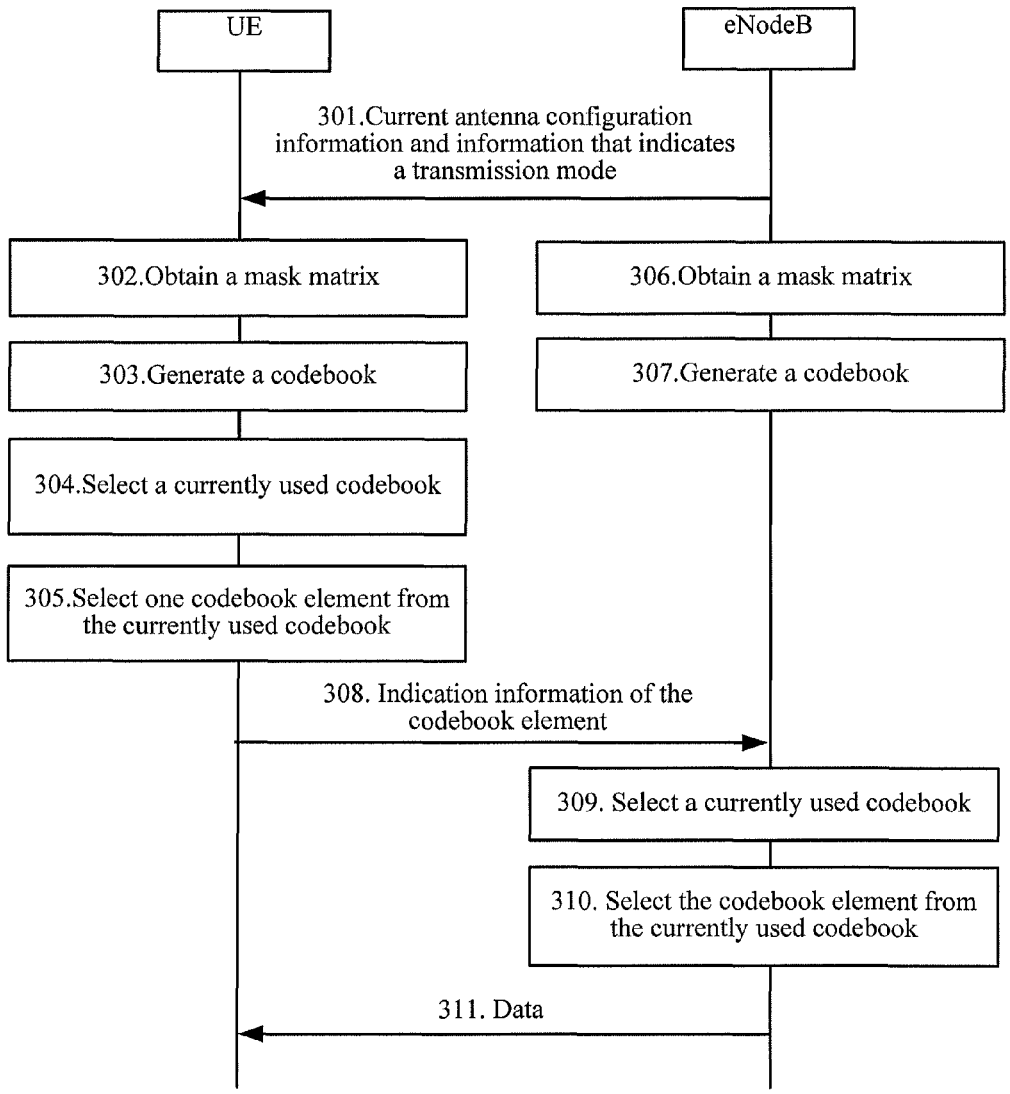
FIG. 3 is a schematic flowchart of a process of a method for transmitting data using a codebook according to an embodiment of the present invention.

The embodiments of the present invention will be described in further detail below through specific examples. FIG. 3 is a schematic flowchart of a process of a method for transmitting data using a codebook according to an embodiment of the present invention. In FIG. 3, illustration is given through an example where the receiving end is a UE and the transmitting end is an eNodeB.

301: An eNodeB transmits, to a UE, current antenna configuration information and information that indicates a transmission mode.

The eNodeB may transmit the current antenna configuration information to the UE by using a broadcast manner, a unicast manner, or a multicast manner. Specifically, the use of the broadcast manner may mean that the current antenna configuration information is for all UEs in a cell. The use of the unicast manner may mean that the current antenna configuration information is for one UE. The use of the multicast manner may mean that the current antenna configuration information is for a group of UEs.

For example, the eNodeB may transmit, to all UEs in a current cell, antenna configuration information corresponding to all antennas in the cell through an MIB or an SIB; or may transmit, to one UE or a group of UEs in the current cell, antenna configuration information corresponding to antennas being currently used through CSI-RS configuration signaling.

In addition, if the CSI-RS configuration signaling includes information about a CSI-RS group, the current antenna configuration information may correspond to the CSI-RS group. For example, in a case where CSI-RSs are grouped, when measurement and feedback are performed corresponding to CSI-RSs in the group, the eNodeB may transmit the current antenna configuration information while transmitting information about the CSI-RS group to the UE through CSI-RS configuration signaling. At this time, the current antenna configuration information corresponds to antennas used by the CSI-RS group.

Definitely, the eNodeB may transmit the information for indicating the transmission mode to the UE in the same manner, so the details will not be described herein again.

In addition, it should be noted that, the eNodeB may also transmit the information for indicating the transmission mode and the current antenna configuration information to the UE respectively at different time points and in different manner, which is not limited in the embodiment of the present invention.

302: The UE obtains a mask matrix corresponding to the current antenna configuration according to the current antenna configuration information.

The current antenna configuration information may include the current number to of antennas of the eNodeB, and the mask matrix may be a ta×tm matrix, where tm is the maximum number of antennas fed back through the CSI, and in the mask matrix, each element has a value of 0 or 1, at most one element in each line has a value of 1, and at most one element in each column has a value of 1.

303: The UE generates a codebook corresponding to the current antenna configuration according to a mother codebook and the mask matrix, where the mother codebook corresponds to the maximum number of antennas and the maximum number of layers that are fed back through CSI.

All or a part of codebook elements in the mother codebook are applicable to any antenna polarization type and any antenna spacing. Because the mother codebook is designed for all possible antenna configuration in a system, all or a part of codebook elements in the mother codebook cover any antenna configuration in the system. In addition, the mother codebook is the same throughout a network.

The UE may left-multiply the codebook element $W_M(i)$ in the mother codebook by the mask matrix M, to generate a codebook element $W(i)$ of the codebook, where i is a positive integer, representing a serial number of the codebook element $W_M(i)$ or a serial number of the codebook element $W(i)$. That is, $W(i)=M \times W_M(i)$, where $W_M(i)$ represents an ith codebook element in the mother codebook, and $W(i)$ represents an ith codebook element in the codebook. Because the mask matrix is a matrix of 0's and 1's, the codebook element $W_M(i)$ in the mother codebook is left-multiplied by the mask matrix M, that is, a particular line is extracted from $W_M(i)$, to generate $W(i)$. Therefore, the value of the mask matrix M is also associated with the mother codebook.

For example, if the mother codebook $W_M$ is a 4×1 codebook, one codebook element $$W_M(i) = \left[ 1 \quad \frac{\pi}{2} \quad \pi \quad \frac{3\pi}{2} \right]^T,$$

where the superscript T represents a matrix transpose. If $$M = \begin{bmatrix} 1 & 0 & 0 & 0 \\ 0 & 1 & 0 & 0 \end{bmatrix}, \text{ then } W(i) = \left[ 1 \quad \frac{\pi}{2} \quad 0 \quad 0 \right]^T,$$

that is, first two lines of $W_M(i)$ are selected.

For example, in an LTE Release 10 system, the maximum number of antennas is 8, and a codebook corresponding to 8 antennas is used as the mother codebook $W_M$. It is assumed that antennas are cross-polarized and antenna spacing is a half-wavelength in the criteria for designing a codebook corresponding to 8 antennas. First four elements in the codebook are for co-polarization and antennas with half-wavelength spacing, and are designed into a DFT matrix, and last four elements are for co-polarization and antennas with half-wavelength spacing in another direction.

The current antenna configuration information in step 301 may further include an antenna polarization type and antenna spacing. If the current antenna configuration is 2 antennas and antenna cross-polarization, the UE may obtain a mask matrix of [e1,e5]T. If the current antenna configuration is 2 antennas, antenna co-polarization and half-wavelength antenna spacing, the UE may obtain a mask matrix of [e1,e2]T. If the current antenna configuration is 4 antennas, antenna cross-polarization and half-wavelength antenna spacing, the UE may obtain a mask matrix of [e1,e2,e6,e7]T. If the current antenna configuration is 4 antennas, antenna co-polarization and half-wavelength antenna spacing, the UE may obtain a mask matrix of [e1,e2,e3,e4]T, where ek is an 8×1 column vector, a kth element of ek has a value of 1, all other elements than the kth element have a value of 0, and k is any element in a collection {1,2,3,4,5,6,7,8}.

The UE may left-multiply the codebook element $W_M(i)$ in the mother codebook by an element ek in the mask matrix, that is, select a kth line from $W_M(i)$.

304: According to the transmission mode obtained from the information indicating the transmission mode in step 301, the UE selects, from the codebook generated in step 303, all or a subset of the codebook to serve as a currently used codebook, where the subset is obtained by down-sampling the codebook.

Because the multi-user transmission mode requires higher codebook accuracy than the single-user transmission mode, the UE in the multi-user transmission mode may select the codebook generated in step 303 to serve as the currently used codebook, and the UE in the single-user transmission mode may select a codebook obtained by down-sampling the codebook in step 303 to serve as the currently used codebook. Down-sampling may refer to that, for the fixed number of antennas, the number of codebook elements is reduced in a certain manner based on the codebook elements of an original codebook. A value obtained by dividing the number of codebook elements of the original codebook by the number of codebook elements in a codebook after down-sampling is referred to as a down-sampling rate.

For example, if a 4-antenna codebook is obtained through 4-fold over-sampling criteria based on 4-point (point) DFT, the number of codebook elements is 16. The codebook is subjected to 2-fold down-sampling, which may be performed in a manner of selecting one codebook element from every other codebook element, that is, if index values of original codebook elements are 1, 2, 3, . . . , and 16, only a codebook formed by the codebook elements corresponding to index numbers 1, 3, 5, . . . , and 15 is used after 2-fold down-sampling. It should be noted that, the down-sampling manner is not limited to the examples described above, and other manners may also be adopted for codebooks designed based on different criteria, for example, skipping several codebook elements at the beginning, and then selecting one codebook element from every several codebook elements. The embodiment of the present invention is not limited thereto.

In addition, the UE and the eNodeB both selects the currently used codebook in the same manner, so that the eNodeB does not need to deliver, to the UE, information about whether to down-sample the codebook and how to perform down-sampling, thereby saving overhead.

305: The UE selects one codebook element from the currently used codebook selected in step 304.

For example, the UE may select one codebook element from the currently used codebook according to a certain index, such as throughput, and then traverse all possible codebook elements in the codebook, and select one element as a codebook element which makes the index to the maximum value. The process may be performed with reference to the prior art, so the details will not be described herein again.

306: The eNodeB obtains a mask matrix corresponding to the current antenna configuration according to the current antenna configuration information.

The current antenna configuration information in step 301 may include the current number to of antennas of the eNodeB, and the mask matrix may be a ta×tm matrix, where tm is the maximum number of antennas fed back through the CSI, and in the mask matrix, each element has a value of 0 or 1, at most one element in each line has a value of 1, and at most one element in each column has a value of 1.

307: The eNodeB generates a codebook corresponding to the current antenna configuration according to a mother codebook and the mask matrix, where the mother codebook corresponds to the maximum number of antennas and the maximum number of layers that are fed back through CSI.

All or a part of codebook elements in the mother codebook are applicable to any antenna polarization type and any antenna spacing. Because the mother codebook is designed for all possible antenna configuration in a system, all or a part of codebook elements in the mother codebook cover any antenna configuration in the system. In addition, the mother codebook is the same throughout a network.

The eNodeB may left-multiply the codebook element $W_M(i)$ in the mother codebook by the mask matrix M, to generate a codebook element W(i) of the codebook, where i is a positive integer, representing a serial number of the codebook element $W_M(i)$ or a serial number of the codebook element W(i). That is, $W(i)=M \times W_M(i)$, where $W_M(i)$ represents an ith codebook element in the mother codebook, and W(i) represents an ith codebook element in the codebook. Because the mask matrix is a matrix of 0's and 1's, the codebook element $W_M(i)$ in the mother codebook is left-multiplied by the mask matrix M, that is, a particular line is extracted from $W_M(i)$, to generate W(i). Therefore, the value of the mask matrix M is also associated with the mother codebook.

The current antenna configuration information in step 301 may further include an antenna polarization type and antenna spacing. In a condition where the mother codebook is a codebook corresponding to 8 antennas in LTE release 10, if the current antenna configuration is 2 antennas and antenna cross-polarization, the eNodeB may obtain a mask matrix of [e1,e5]T. If the current antenna configuration is 2 antennas, antenna co-polarization and half-wavelength antenna spacing, the eNodeB may obtain a mask matrix of [e1,e2]T. If the current antenna configuration is 4 antennas, antenna cross-polarization and half-wavelength antenna spacing, the eNodeB may obtain a mask matrix of [e1,e2,e6,e7]T. If the current antenna configuration is 4 antennas, antenna co-polarization and half-wavelength antenna spacing, the eNodeB may obtain a mask matrix of [e1,e2,e3,e4]T, where ek is an 8×1 column vector, a kth element of ek has a value of 1, all other elements than the kth element have a value of 0, and k is any element in a collection {1,2,3,4,5,6,7,8}.

The process of step 307 is similar to that of step 303, so the details will not be described herein again for purpose of brevity.

308: The UE transmits, to the eNodeB, indication information of the codebook element selected in step 305.

Because the effect of applying the mask matrix to codebook elements in the mother codebook is to extract a part of the codebook elements in the mother codebook, the number of non-repetitive codebook elements in the currently used codebook is smaller than or equal to the number of codebook elements in the mother codebook. Therefore, the indication information that is corresponding to the codebook element and is transmitted to the eNodeB by the UE may be PMI of a codebook element in the mother codebook, or PMI of a non-repetitive codebook element in the currently used codebook.

If the indication information is PMI of a codebook element in the mother codebook, codebook elements in the currently used codebook that are indicated by different pieces of PMI may be repetitive.

If the indication information is PMI of a non-repetitive codebook element in the currently used codebook, feedback overhead is generally smaller than the feedback overhead of the PMI of the codebook element in the mother codebook.

For example, if a codebook corresponding to 8 antennas in LTE Release 10 is used as the mother codebook, the mother codebook includes 256 codebook elements in total, where the PMI may be represented by using 8 bits. If the current antenna configuration is 4 antennas and antenna co-polarization, 32 non-repetitive codebook elements can be obtained through extraction performed by left-multiplying the mother codebook by the mask matrix. An 8-bit PMI of the codebook element in the mother codebook may be used to indicate a codebook element in the currently used codebook, and at this time, the PMI may be represented by using 8 bits. If PMI of a non-repetitive codebook element in the currently used codebook is used for indication, the PMI may be represented by using 5 bits. In this way, the feedback overhead (the number of bits of the PMI is 5) of the PMI of the non-repetitive codebook element in the currently used codebook is smaller than the feedback overhead (the number of bits of the PMI is 8) of the PMI of the codebook element in the mother codebook.

In addition, the indication information may further include first indication information and second indication information, where the first indication information may indicate a codebook group corresponding to channel wideband and long-term channel characteristics in the currently used codebook, the second indication information may indicate a codebook element corresponding to short-term channel characteristics in the codebook group, and the second indication information is determined according to the first indication information. For example, after performing channel measurement, the UE may select two PMI values, needs to learn which PMI is used as first PMI when selecting second PMI, and may transmit the first PMI and the second PMI to the transmitting end through feedback with different feedback periods and feedback time offsets. The eNodeB needs to combine the two pieces of PMI to obtain a corresponding codebook element.

Taking an 8-antenna codebook in LTE Release 10 as an example, there are 256 codebook elements in total, and the corresponding PMI may be represented by using 8 bits, where 128 codebook elements are non-repetitive, and the UE may perform transmission for twice, that is, transmit the first PMI and the second PMI to the eNodeB. The first PMI may be represented by using 4 bits, and the second PMI may be represented by using 4 bits.

For example, if the current antenna configuration is 2 antennas and antenna co-polarization, there are 32 non-repetitive codebook elements in total in the codebook generated in step 303, the first PMI may be represented by using 4 bits, the second PMI may be represented by using 1 bit, and the first PMI and the second PMI together use 5 bits to represent 32 codebook elements. If the current antenna configuration is 2 antennas and antenna cross-polarization, there are 128 non-repetitive codebook elements in total in the codebook generated in step 303, the first PMI may be represented by using 4 bits, and the second PMI may be represented by using 4 bits. If the current antenna configuration is 4 antennas and antenna co-polarization, there are 32 non-repetitive codebook elements in total in the codebook generated in step 303, the first PMI may be represented by using 4 bits, and the second PMI may be represented by using 1 bit. If the current antenna configuration is 4 antennas and antenna cross-polarization, there are 128 non-repetitive codebook elements in total in the codebook generated in step 303, the first PMI may be represented by using 4 bits, and the second PMI may be represented by using 4 bits.

309: The eNodeB selects, from the codebook generated in step 307, all or a subset of the codebook to serve as a currently used codebook according to the transmission mode, where the subset is obtained by down-sampling the codebook.

The process of step 309 is similar to that of step 304, that is, the eNodeB and the UE may select the currently used codebook in the same manner, so that the currently used codebook selected in step 309 is the same as the currently used codebook selected in step 304. In this way, the eNodeB does not need to deliver, to the UE, information about whether to down-sample the codebook and how to perform down-sampling, thereby saving overhead.

For other processes of step 309, reference may be made to step 304, so the details will not be described herein again to avoid redundancy.

310: According to the indication information of the codebook element received from the UE in step 308, the eNodeB obtains the codebook element from the currently used codebook selected in step 309, so as to determine channel information of a channel used for transmitting data.

The indication information corresponding to the codebook element W(i) may be PMI of the codebook element $W_M(i)$ in the mother codebook, or PMI of the codebook element W(i).

If the indication information further includes first indication information and second indication information, where the first indication information indicates a codebook group corresponding to channel wideband and long-term channel characteristics in the currently used codebook, the second indication information indicates a codebook element corresponding to short-term channel characteristics in the codebook group, and the second indication information is determined according to the first indication information, the eNodeB needs to obtain the codebook element according to the first indication information and the second indication information.

For example, the first indication information may be the first PMI in step 308, and the second indication information may be the second PMI in step 308. Because the two pieces of PMI usually have different feedback periods, and the first PMI has a long feedback period, the eNodeB may obtain a specific codebook element from the currently used codebook according to the second PMI and the first PMI that is fed back most recently by the UE, after obtaining the second PMI.

311: The eNodeB transmits data to the UE according to the channel information determined in step 310.

For example, the eNodeB may determine, according to the codebook element in 310, channel information of a channel used for transmitting data to the UE, precode to-be-transmitted data by using the codebook element obtained in 310, and transmit the precoded data to the UE.

It should be noted that, the sequence numbers of the above processes do not imply an execution sequence, and the execution sequence of the processes should be determined according to the functions and internal logic, which is not intended to limit the implementation processes of the embodiments of the present invention in any way. For example, steps 302-305 may be executed concurrently with or before steps 306-307.

In the embodiment of the present invention, a mask matrix is obtained according to current antenna configuration information, and a codebook is generated according to the mask matrix and a mother codebook corresponding to the maximum number of antennas and the maximum number of layers that are fed back through channel state information, whereby the accuracy of the codebook can be improved.

Figure 4:
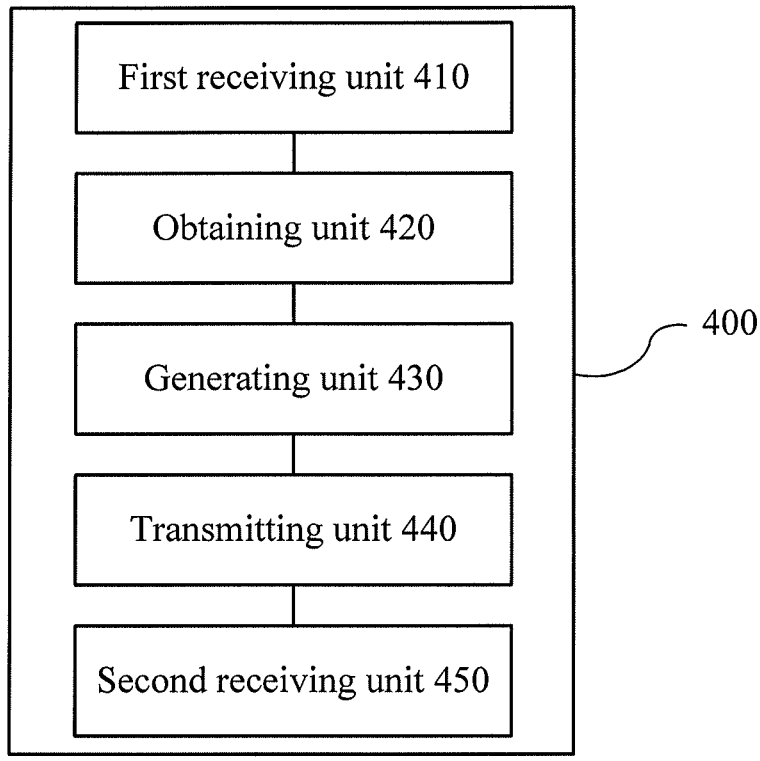
FIG. 4 is a block diagram of an apparatus for transmitting data using a codebook according to an embodiment of the present invention.

FIG. 4 is a block diagram of an apparatus for transmitting data using a codebook according to an embodiment of the present invention. One example of an apparatus 400 in FIG. 4 is a receiving end, and for example, may be a UE. The apparatus 400 includes a first receiving unit 410, an obtaining unit 420, a generating unit 430, a transmitting unit 440 and a second receiving unit 450.

The first receiving unit 410 receives current antenna configuration information of a transmitting end. The obtaining unit 420 obtains a mask matrix corresponding to current antenna configuration according to the current antenna configuration information. The generating unit 430 generates a codebook corresponding to the current antenna configuration according to a mother codebook and the mask matrix, where the mother codebook corresponds to the maximum number of antennas and the maximum number of layers that are fed back through channel state information. The transmitting unit 440 selects one codebook element from the codebook, and transmits indication information corresponding to the codebook element to the transmitting end, where the indication information is used by the transmitting end to determine channel information of a channel to be used by the transmitting end for transmitting data. The second receiving unit 450 receives data transmitted by the transmitting end.

In the embodiment of the present invention, a mask matrix is obtained according to current antenna configuration information, and a codebook is generated according to the mask matrix and a mother codebook corresponding to the maximum number of antennas and the maximum number of layers that are fed back through channel state information, whereby the accuracy of the codebook can be improved.

For other functions and operations of the apparatus 400, reference may be made to the processes involving the receiving end in the above method embodiments of FIG. 1 and FIG. 3, so the details will not be described herein again to avoid redundancy.

Optionally, as an embodiment, the current antenna configuration information received by the first receiving unit 410 may include the current number to of antennas, and the mask matrix obtained by the obtaining unit 420 may be a ta×tm matrix, where tm is the maximum number of antennas that is fed back through the CSI, and in the mask matrix, each element has a value of 0 or 1, at most one element in each line has a value of 1, and at most one element in each column has a value of 1.

Optionally, as another embodiment, the generating unit 430 may left-multiply the codebook element $W_M(i)$ in the mother codebook by the mask matrix M, to generate a codebook element $W(i)$ of the codebook, where i is a positive integer, representing a serial number of the codebook element $W_M(i)$ or a serial number of the e codebook element $W(i)$.

Optionally, as another embodiment, the first receiving unit 410 may further receive information, from the transmitting end, for indicating a transmission mode, so as to obtain the transmission mode. The transmitting unit 440 may select all or a subset of the codebook from the codebook according to the transmission mode to serve as a currently used codebook, where the subset is obtained by down-sampling the codebook; and select the codebook element from the currently used codebook.

Optionally, as another embodiment, the indication information transmitted by the transmitting unit 440 may further include first indication information and second indication information, where the first indication information indicates a codebook group corresponding to channel wideband and long-term channel characteristics in the currently used codebook, the second indication information indicates a codebook element corresponding to short-term channel characteristics in the codebook group, and the second indication information is determined according to the first indication information Optionally, as another embodiment, the indication information that is corresponding to the codebook element $W(i)$ and is transmitted by the transmitting unit 440 may be PMI of the codebook element $W_M(i)$ in the mother codebook, or PMI of the codebook element $W(i)$.

Optionally, as another embodiment, the current antenna configuration information received by the first receiving unit 410 may further include an antenna polarization type and antenna spacing. In a condition where the mother codebook is a codebook corresponding to 8 antennas in LTE release 10, if the current antenna configuration is 2 antennas and antenna cross-polarization, the mask matrix obtained by the obtaining unit 420 is [e1,e5]T. If the current antenna configuration is 2 antennas, antenna co-polarization and half-wavelength antenna spacing, the mask matrix obtained by the obtaining unit 420 is [e1,e2]T. If the current antenna configuration is 4 antennas, antenna cross-polarization and half-wavelength antenna spacing, the mask matrix obtained by the obtaining unit 420 is [e1,e2,e6,e7]T. If the current antenna configuration is 4 antennas, antenna co-polarization and half-wavelength antenna spacing, the mask matrix obtained by the obtaining unit 420 is [e1,e2,e3,e4]T, where ek is an 8×1 column vector, a kth element of ek has a value of 1, all other elements than the kth element have a value of 0, and k is any element in a collection {1,2,3,4,5,6,7,8}.

Optionally, as another embodiment, the first receiving unit 410 may receive the current antenna configuration information of the transmitting end through an MIB or an SIB, or may receive the current antenna configuration information of the transmitting end through CSI-RS configuration signaling.

Optionally, as another embodiment, if the CSI-RS configuration signaling used by the first receiving unit 410 includes information about a CSI-RS group, the current antenna configuration information corresponds to the CSI-RS group.

Figure 5:
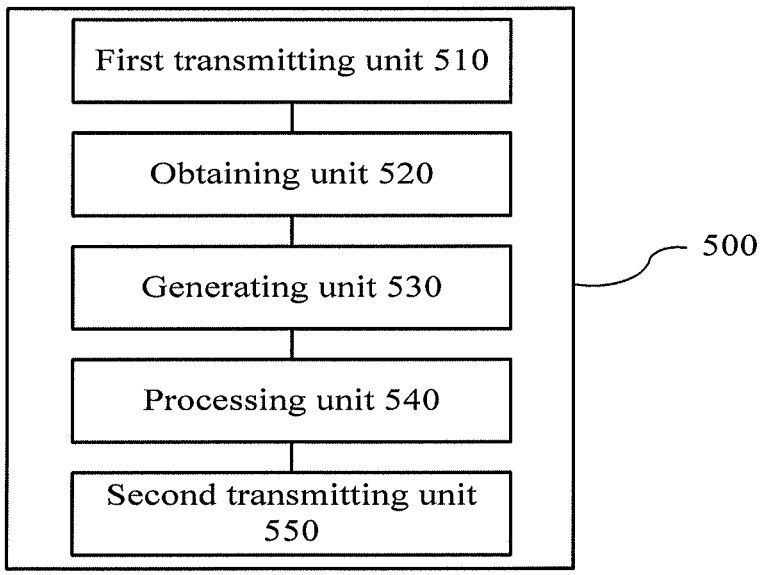
FIG. 5 is a block diagram of an apparatus for transmitting data using a codebook according to an embodiment of the present invention.

FIG. 5 is a block diagram of an apparatus for transmitting data using a codebook according to an embodiment of the present invention. One example of an apparatus 500 in FIG. 5 is a transmitting end, and for example, may be an eNodeB. The apparatus 500 includes a first transmitting unit 510, an obtaining unit 520, a generating unit 530, a processing unit 540 and a second transmitting unit 550.

The first transmitting unit 510 transmits current antenna configuration information to a receiving end. The obtaining unit 520 obtains a mask matrix corresponding to current antenna configuration according to the current antenna configuration information. The generating unit 530 generates a codebook corresponding to the current antenna configuration according to the mask matrix and a mother codebook, where the mother codebook corresponds to the maximum number of antennas and the maximum number of layers that are fed back through channel state information. The processing unit 540 receives indication information corresponding to one codebook element in the codebook from the receiving end, and obtains the codebook element according to the indication information, so as to determine channel information of a channel used for transmitting data. The second transmitting unit 550 transmits data to the receiving end according to the channel information.

In the embodiment of the present invention, a mask matrix is obtained according to current antenna configuration information, and a codebook is generated according to the mask matrix and a mother codebook corresponding to the maximum number of antennas and the maximum number of layers that are fed back through channel state information, whereby the accuracy of the codebook can be improved.

For other functions and operations of the apparatus 500, reference may be made to the processes involving the transmitting end in the above method embodiments of FIG. 2 and FIG. 3, so the details will not be described herein again to avoid redundancy.

Optionally, as an embodiment, the current antenna configuration information transmitted by the first transmitting unit 510 may include the current number to of antennas. The mask matrix obtained by the obtaining unit 520 may be a ta×tm matrix, where tm is the maximum number of antennas fed back through the CSI, and in the mask matrix, each element has a value of 0 or 1, at most one element in each line has a value of 1, and at most one element in each column has a value of 1.

Optionally, as another embodiment, the generating unit 530 may left-multiply the codebook element $W_M(i)$ in the mother codebook by the mask matrix M, to generate a codebook element $W(i)$ of the codebook, where i is a positive integer, representing a serial number of the codebook element $W_M(i)$ or a serial number of the e codebook element $W(i)$.

Optionally, as another embodiment, the first transmitting unit 510 may further transmit information used for indicating a transmission mode to the receiving end. The processing unit 540 may select all or a subset of the codebook from the codebook according to the transmission mode to serve as a currently used codebook, where the subset is obtained by down-sampling the codebook; and select the codebook element from the currently used codebook according to the indication information.

Optionally, as another embodiment, the indication information used by the processing unit 540 may further include first indication information and second indication information, where the first indication information indicates a codebook group corresponding to channel wideband and long-term channel characteristics in the currently used codebook, the second indication information indicates a codebook element corresponding to short-term channel characteristics in the codebook group, and the second indication information is determined according to the first indication information Optionally, as another embodiment, the indication information that is corresponding to the codebook element W(i) and is used by the processing unit 540 may be PMI of the codebook element $W_M(i)$ in the mother codebook, or PMI of the codebook element W(i).

Optionally, as another embodiment, the current antenna configuration information transmitted by the first transmitting unit 510 may further include an antenna polarization type and antenna spacing. In a condition where the mother codebook is a codebook corresponding to 8 antennas in LTE release 10, if the current antenna configuration is 2 antennas and antenna cross-polarization, the mask matrix obtained by the obtaining unit 520 is [e1,e5]T. If the current antenna configuration is 2 antennas, antenna co-polarization and half-wavelength antenna spacing, the mask matrix obtained by the obtaining unit 520 is [e1,e2]T. If the current antenna configuration is 4 antennas, antenna cross-polarization and half-wavelength antenna spacing, the mask matrix obtained by the obtaining unit 520 is [e1,e2,e6,e7]T. If the current antenna configuration is 4 antennas, antenna co-polarization and half-wavelength antenna spacing, the mask matrix obtained by the obtaining unit 520 is [e1,e2,e3,e4]T, where ek is an 8×1 column vector, a kth element of ek has a value of 1, all other elements than the kth element have a value of 0, and k is any element in a collection {1,2,3,4,5,6,7,8}.

Optionally, as another embodiment, the first transmitting unit 510 may transmit the current antenna configuration information to the receiving end through an MIB or an SIB, or may transmit the current antenna configuration information to the receiving end through CSI-RS configuration signaling.

Optionally, as another embodiment, if the CSI-RS configuration signaling used by the transmitting unit 510 includes information about a CSI-RS group, the current antenna configuration information corresponds to the CSI-RS group.

Persons of ordinary skill in the art may be aware that the various exemplary units and algorithm steps described in conjunction with the embodiments disclosed herein can be implemented by electronic hardware, or a combination of computer software and electronic hardware. Whether the functions are executed by hardware or software depends on particular applications and design constraint conditions of the technical solutions. Persons skilled in the art can use different methods to implement the described functions for every particular application, but it should not be considered that the implementation goes beyond the scope of the present invention.

It is apparent to persons skilled in the art that for the specific working processes of the system, apparatus and unit described above, reference may be made to the corresponding processes in the above method embodiments, so the details will not be described herein again for purpose of convenience and brevity of description.

In the embodiments provided in the present application, it should be understood that the disclosed system, apparatus, and method may be implemented in other manners. For example, the apparatus embodiments described above are merely exemplary. For example, the division of units is merely the division of logical functions and there may be other division manners in actual applications. For example, multiple units or components may be combined or may be integrated to another system, or some features may be ignored or not executed. Furthermore, the shown or discussed coupling or direct coupling or communication connection may be accomplished through some interfaces, and indirect coupling or communication connection between apparatuses or units may be electrical, mechanical, or in other forms.

The units described as separate parts may or may not be physically separate, and parts displayed as units may or may not be physical units, that is, they may be located in one position, or may be distributed on multiple network elements. A part or all of the units may be selected according to actual needs to achieve the objectives of the solutions of the embodiments.

In addition, function units in the embodiments of the present invention may be integrated into a processing unit, or each of the units may exist alone physically, or two or more units are integrated into a unit.

When being implemented in the form of a software function unit and sold or used as a stand-alone product, the functions may be stored in a computer-readable storage medium. Based on such understanding, the essence of the technical solutions of the present invention, or the part that makes contributions to the prior art, or a part of the technical solutions may be embodied in the form of a software product. The computer software product may be stored in a storage medium, and incorporates several instructions for instructing a computer device (for example, personal computer, server, or network device) to execute all or part of the steps of the method in any embodiment of the present invention. The storage medium may be any medium that is capable of storing program codes, such as a USB flash drive, a removable hard disk, a Read-Only Memory (ROM, Read-Only Memory), a Random Access Memory (RAM, Random Access Memory), a magnetic disk, or an optical disk.

What is claimed is:

1. A method for transmitting data using a codebook, comprising:
   receiving, by a receiving end, current antenna configuration information of a transmitting end;
   obtaining, by the receiving end, a mask matrix corresponding to current antenna configuration according to the current antenna configuration information;
   generating, by the receiving end, a codebook corresponding to the current antenna configuration according to a mother codebook and the mask matrix, wherein the mother codebook corresponds to a maximum number of antennas and a maximum number of layers that are fed back through channel state information;
   selecting, by the receiving end, one codebook element from the codebook, and transmitting indication information corresponding to the codebook element to the transmitting end, wherein the indication information is used by the transmitting end to determine channel information of a channel to be used by the transmitting end for transmitting the data; and
   receiving, by the receiving end, the data transmitted by the transmitting end;
   wherein the current antenna configuration information comprises a current number $t_a$ of antennas of the transmitting end, and the mask matrix is a $t_a \times t_m$ matrix, wherein tm is the maximum number of antennas fed back through the channel state information, and in the mask matrix, each element has a value of 0 or 1, at most one element in each line has a value of 1, and at most one element in each column has a value of 1 and an antenna polarization type and antenna spacing;
and
obtaining, by the transmitting end, the mask matrix corresponding to the current antenna configuration comprises:
in a condition where the mother codebook is a codebook corresponding to 8 antennas in long term evolution LTE release 10,
when the current antenna configuration is 2 antennas and antenna cross-polarization, the obtained mask matrix is $[e_1,e_5]^T$;
if the current antenna configuration is 2 antennas, antenna co-polarization and half-wavelength antenna spacing, the obtained mask matrix is $[e_1,e_2]^T$;
when the current antenna configuration is 4 antennas, antenna cross-polarization and half-wavelength antenna spacing, the obtained mask matrix is $[e_1,e_2,e_6,e_7]^T$; and
when the current antenna configuration is 4 antennas, antenna co-polarization and half-wavelength antenna spacing, the obtained mask matrix is $[e_1,e_2,e_3,e4]^T$;
wherein, ek is an 8×1 column vector, a $k^{th}$ element of $e_k$ has a value of 1, all other elements than the $k^{th}$ element have a value of 0, and k is any element in a collection {1,2,3, 4,5,6,7,8}.

2. A method for transmitting data using a codebook, comprising:
transmitting, by a transmitting end, current antenna configuration information to a receiving end;
obtaining, by the transmitting end, a mask matrix corresponding to current antenna configuration according to the current antenna configuration information;
generating, by a transmitting end, a codebook corresponding to the current antenna configuration according to a mother codebook and the mask matrix, wherein the mother codebook corresponds to a maximum number of antennas and a maximum number of layers that are fed back through channel state information;
receiving, by a transmitting end, indication information corresponding to one codebook element in the codebook from the receiving end, and obtaining the codebook element according to the indication information, so as to determine channel information of a channel used for transmitting the data; and
transmitting, by the transmitting end, the data to the receiving end according to the channel information;
wherein the current antenna configuration information comprises an antenna polarization type and antenna spacing, and
obtaining, by the transmitting end, the mask matrix corresponding to the current antenna configuration comprises:
in a condition where the mother codebook is a codebook corresponding to 8 antennas in long term evolution LTE release 10,
when the current antenna configuration is 2 antennas and antenna cross-polarization, the obtained mask matrix is $[e_1,e_5]^T$;
when the current antenna configuration is 2 antennas, antenna co-polarization and half-wavelength antenna spacing, the obtained mask matrix is $[e_1,e_2]^T$;

when the current antenna configuration is 4 antennas, antenna cross-polarization and half-wavelength antenna spacing, the obtained mask matrix is $[e_1,e_2,e_6,e_7]^T$; and
when the current antenna configuration is 4 antennas, antenna co-polarization and half-wavelength antenna spacing, the obtained mask matrix is $[e_1,e_2,e_3,e_4]^T$;
wherein, ek is an 8×1 column vector, a $k^{th}$ element of $e_k$ has a value of 1, all other elements than the $k^{th}$ element have a value of 0, and k is any element in a collection {1,2,3, 4,5,6,7, 8}.

3. An apparatus for transmitting data using a codebook at a receiving end in a wireless communications system, comprising:
a first receiving unit, configured to receive current antenna configuration information of a transmitting end;
an obtaining unit, configured to obtain a mask matrix corresponding to current antenna configuration according to the current antenna configuration information;
a generating unit, configured to generate a codebook corresponding to the current antenna configuration according to a mother codebook and the mask matrix, wherein the mother codebook corresponds to a maximum number of antennas and a maximum number of layers that are fed back through channel state information;
a transmitting unit, configured to select one codebook element from the codebook, and transmit indication information corresponding to the codebook element to the transmitting end, wherein the indication information is used by the transmitting end to determine channel information of a channel to be used by the transmitting end for transmitting the data; and
a second receiving unit, configured to receive the data transmitted by the transmitting end;
wherein the generating unit is configured to left-multiply a codebook element $W_M(i)$ in the mother codebook by the mask matrix, to generate a codebook element $W(i)$ of the codebook, wherein i is a positive integer, representing a serial number of the codebook element $W_M(i)$ or a serial number of the codebook element $W(i)$;
wherein the current antenna configuration information received by the first receiving unit comprises an antenna polarization type and antenna spacing, and
the obtaining unit is configured to, in a condition where the mother codebook is a codebook corresponding to 8 antennas in long term evolution LTE release 10, when the current antenna configuration is 2 antennas and antenna cross-polarization, obtain the mask matrix being $[e_1,e_5]^T$; when the current antenna configuration is 2 antennas, antenna co-polarization and half-wavelength antenna spacing, obtain the mask matrix being $[e^1,e^2]^T$; when the current antenna configuration is 4 antennas, antenna cross-polarization and half-wavelength antenna spacing, obtain the mask matrix being $[e^1,e^2,e^6,e^7]^T$; and when the current antenna configuration is 4 antennas, antenna co-polarization and half-wavelength antenna spacing, obtain the mask matrix being $[e^1,e^2,e^3,e^4]^T$, wherein, ek is an 8×1 column vector, a $k^{th}$ element of $e_k$ has a value of 1, all other elements than the $k^{th}$ element have a value of 0, and k is any element in a collection {1,2,3,4,5,6,7,8}.

4. An apparatus for transmitting data using a codebook at a transmitting end in a wireless communications system, comprising:
a first transmitting unit, configured to transmit current antenna configuration information to a receiving end;

an obtaining unit, configured to obtain a mask matrix corresponding to current antenna configuration according to the current antenna configuration information;

a generating unit, configured to generate a codebook corresponding to the current antenna configuration according to the mask matrix and a mother codebook, wherein the mother codebook corresponds to a maximum number of antennas and a maximum number of layers that are fed back through channel state information;

a processing unit, configured to receive indication information corresponding to one codebook element in the codebook from the receiving end, and obtain the codebook element according to the indication information, so as to determine channel information of a channel used for transmitting the data; and a second transmitting unit, configured to transmit the data to the receiving end according to the channel information;

wherein the current antenna configuration information transmitted by the first transmitting unit comprises a current number $t_a$ of antennas, and the mask matrix obtained by the obtaining unit is a $t_a \times t_m$ matrix, wherein $t_m$ is the maximum number of antennas fed back through the channel state information, and in the mask matrix, each element has a value of 0 or 1, at most one element in each line has a value of 1, and at most one element in each column has a value of 1;

wherein the current antenna configuration information transmitted by the first transmitting unit further comprises an antenna polarization type and antenna spacing, and the obtaining unit is configured to, in a condition where the mother codebook is a codebook corresponding to 8 antennas in long term evolution LTE release 10, if the current antenna configuration is 2 antennas and antenna cross-polarization, obtain the mask matrix being $[e_1,e_5]^T$; if the current antenna configuration is 2 antennas, antenna co-polarization and half-wavelength antenna spacing, obtain the mask matrix being $[e_1,e_2]^T$; if the current antenna configuration is 4 antennas, antenna cross-polarization and half-wavelength antenna spacing, obtain the mask matrix being $[e_1,e_2,e_6,e_7]^T$; and if the current antenna configuration is 4 antennas, antenna co-polarization and half-wavelength antenna spacing, obtain the mask matrix being $[e_1,e_2,e_3,e_4]^T$, wherein, $e_k$ is an 8×1 column vector, a $k^{th}$ element of $e_k$ has a value of 1, all other elements than the $k^{th}$ element have a value of 0, and k is any element in a collection $\{1,2,3,4,5,6,7,8\}$.

* * * * *